Patented July 31, 1951

2,562,487

UNITED STATES PATENT OFFICE 2,562,487

PRODUCTION OF 1-METHYLCYCLO-PENTANONE-2

Louis Léon Joseph Fauqué, Premery, France, assignor to Etablissements Lambiotte Freres, Premery, France, a corporation of France No Drawing. Application March 19, 1948, Serial No. 15,978. In France October 20, 1947

4 Claims. (Cl. 260—586)

The present invention relates to a method of preparation of 1-methyl cyclopentan-2-one, starting from 1-methyl-$\Delta'$-cyclopenten-2-ol-3-one.

It is known that 1-methyl-$\Delta'$-cyclopenten-2-ol-3-one may be extracted from wood tars (Meyerfeld: Chemiker Zeitung, 36, 549, 1912). This substance crystallizes very easily and may, consequently, be obtained in a state of very great purity.

I have now found that it was possible to obtain methyl-cyclopentanone from 1-methyl-$\Delta'$-cyclopenten-2-ol-3-one.

According to my invention, I submit 1-methyl-$\Delta'$-cyclopenten-2-ol-3-one, possibly hydrated, in gaseous phase, to the action of hydrogen in the presence of Raney nickel preferably deposited on pumice-stone.

The 1-methyl-$\Delta'$-cyclopenten-2-ol-3-one is thus hydrogenated with production of methylcyclopentanediol which is further dehydrated for the greater part, yielding methylcyclopentanone.

For carrying out my method, I may introduce 1-methyl-$\Delta'$-cyclopenten-2-ol-3-one, or its hydrate, in the liquid state, at the end of a tube into which a current of hydrogen is passed, and which contains Raney nickel deposited on pumice-stone. The 1-methyl-$\Delta'$-cyclopenten-2-ol-3-one vapours, swept away by the hydrogen, flow upon the catalyst, which is preferably maintained at a temperature comprised between 180 and 200° C. The reaction products, after condensation, separate in two layers, an oily layer and an aqueous layer. The oily layer, decanted, dried and distilled, yields about 75% of methylcyclopentanone, 13% of methylcyclopentanol and 12% of methylcyclopentanediol-2,3.

The flows of hydrogen and 1-methyl-$\Delta'$-cyclopenten-2-ol-3-one must be such that the amount of hydrogen directed into the catalyst tube should be higher than the amount which is necessary to fix two molecules of hydrogen on one molecule of 1-methyl-$\Delta'$-cyclopenten-2-ol-3-one, the duration of the contact being higher than 30 seconds.

In causing the catalysis factors to be varied, i. e. temperature, duration of contact, relative flow of hydrogen and 1-methyl-$\Delta'$-cyclopenten-2-ol-3-one, I can cause the proportion of the obtained products to vary. Temperature is of prevailing importance; thus, if the catalyst is brought to 150° C. only, I obtain only 40% of methylcyclopentanone, 20% of methylcyclopentanol and 40% of methyl-cyclopentanediol-2,3. However, even at that temperature, if a considerable increase of the duration of contact is not prohibitive, it is possible to raise the yield of methylcyclopentanone.

In all cases, the amount of liquid 1-methyl-$\Delta'$-cyclopenten-2-ol-3-one poured into the catalyzer tube must be kept lower than the amount which may be swept away, in the gaseous state, by the current of hydrogen, allowance being made for the temperature of the hydrogenating process.

The methylcyclopentanone obtained may be used as heavy solvent of cellulosic esters as well as raw material in perfumery, its condensation with aldehydes leading to ketones with ethylenic links, which, when hydrogenated, yield cyclopentanones with lateral chains, which are used in the industry of synthetic perfumes.

What I claim is:

1. A method for producing 1-methyl cyclopentan-2-one which consists in passing a mixture of gaseous hydrated 1-methyl-$\Delta'$-cyclopenten-2-ol-3-one and hydrogen over heated Raney nickel at a temperature between 150° and 200° C., the duration of the contact being greater than 30 seconds and the relative flows of methyl-cyclopentenolone and of hydrogen being such that the mixture contains at least two moles of hydrogen for one mole of methyl-cyclopentenolone, condensing the reaction products which separate into two layers, one oily and one aqueous layer, and distilling the said oily layer to extract the 1-methylcyclopentan-2-one.

2. A method for producing 1-methyl cyclopentan-2-one, which consists in passing a mixture of gaseous 1-methyl-$\Delta'$-cyclopenten-2-ol-3-one and hydrogen over heated Raney nickel at a temperature between 150° and 200° C., the duration of the contact being greater than 30 seconds and the relative flows of methyl-cyclopentenolone and of hydrogen being such that the mixture contains at least two moles of hydrogen for one mole of methyl-cyclopentenolone, the nickel being carried on a pumice stone support, condensing the reaction products which separate into two layers, one oily and one aqueous layer, and distilling the said oily layer to extract the 1-methyl cyclopentan-2-one.

3. A method for producing 1-methyl cyclopentan-2-one, which consists in passing a mixture of gaseous 1-methyl-$\Delta'$-cyclopenten-2-ol-3-one and hydrogen over heated Raney nickel at a temperature between 150° and 200° C., the duration of the contact being greater than 30 seconds, the relative flows of methyl cyclopentenolone and of hydrogen being such the mixture contains at least two moles of hydrogen for one mole of methyl cyclopentenolone, condensing the reaction products which separate in two layers, one oily and one aqueous layer, and distilling the said oily layer to extract the 1-methyl cyclopentan-2-one.

4. A method for producing 1-methyl cyclopentan-2-one, which consists in passing a mixture of gaseous 1-methyl-$\Delta'$-cyclopenten-2-ol-3-one and hydrogen over heated Raney nickel at a temperature between 150° and 200° C., the duration of the contact being higher than 30 seconds and the relative flows of methyl-cyclopentenolone and of hydrogen being such that the mixture contains at least two moles of hydrogen for one mole of methyl-cyclopentenolone, and recovering 1-methylcyclopentan-2-one from the reaction product.

LOUIS LÉON JOSEPH FAUQUÉ.

REFERENCES CITED

The following references are of record in the file of this patent:

UNITED STATES PATENTS

| Number | Name | Date |
|---|---|---|
| 2,096,715 | Haller et al. | Oct. 26, 1937 |

OTHER REFERENCES

Rojahn et al.: Arch, Pharm., vol. 264, pages 211–227 (1926). Abstracted in British Chemical Abstracts, 1926, vol. A, cols. 2484–2485.